United States Patent
Senga et al.

(10) Patent No.: US 11,766,814 B2
(45) Date of Patent: Sep. 26, 2023

(54) INJECTION MOLDING MACHINE

(71) Applicant: FANUC CORPORATION, Yamanashi (JP)

(72) Inventors: Masatoshi Senga, Yamanashi-ken (JP); Satoshi Yano, Yamanashi-ken (JP); Keisuke Sugahara, Yamanashi-ken (JP); Ikuhiro Maki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 206 days.

(21) Appl. No.: 17/081,903

(22) Filed: Oct. 27, 2020

(65) Prior Publication Data

US 2021/0129397 A1    May 6, 2021

(30) Foreign Application Priority Data

Oct. 31, 2019    (JP) .................................. 2019-199261

(51) Int. Cl.
 *B29C 45/07*    (2006.01)

(52) U.S. Cl.
 CPC ........ *B29C 45/07* (2013.01); *B29C 2045/073* (2013.01)

(58) Field of Classification Search
 CPC ..... B29C 45/00; B29C 45/1777; B29C 45/64; B29C 45/1775; B29C 2045/073
 See application file for complete search history.

(56) References Cited

U.S. PATENT DOCUMENTS

| | | | |
|---|---|---|---|
| 6,447,282 B1 * | 9/2002 | Miyauchi ............ | B29C 45/1773 425/574 |
| 2015/0158222 A1 * | 6/2015 | Kitta ................... | B29C 45/1777 425/569 |
| 2021/0031417 A1 * | 2/2021 | Yano ....................... | B29C 45/07 |
| 2022/0152891 A1 * | 5/2022 | Jungnickel ......... | A61C 13/0006 |

FOREIGN PATENT DOCUMENTS

| | | | |
|---|---|---|---|
| JP | H0911276 | * | 6/1995 |
| JP | 09039032 | * | 8/1995 |
| JP | H08257726 A | | 10/1996 |
| JP | 09-039032 A | | 2/1997 |
| JP | 2003320550 A | | 11/2003 |
| JP | 2003340867 A | | 12/2003 |
| JP | 2005111717 A | | 4/2005 |

* cited by examiner

*Primary Examiner* — Nahida Sultana
*Assistant Examiner* — Debjani Roy
(74) *Attorney, Agent, or Firm* — Robert P. Michal, Esq.; Carter, DeLuca & Farrell LLP (57) ABSTRACT

In an injection molding machine including a base, a pivot pin provided on the base, and an injection unit supported by the pivot pin so as to be pivotable relative to the base in a pivoting direction, the injection molding machine is equipped with a rod-shaped member configured to cause the injection unit to pivot in the pivoting direction by pushing the injection unit, and a first support member provided on the base and configured to be screw-engaged with the rod-shaped member.

13 Claims, 9 Drawing Sheets

INJECTION MOLDING MACHINE

CROSS-REFERENCE TO RELATED APPLICATION

This application is based upon and claims the benefit of priority from Japanese Patent Application No. 2019-199261 filed on Oct. 31, 2019, the contents of which are incorporated herein by reference.

BACKGROUND OF THE INVENTION

Field of the Invention

The present invention relates to an injection molding machine.

Description of the Related Art

In relation to an injection unit of an injection molding machine, an injection unit has been proposed that undergoes pivoting about a pivot pin. Such an injection unit is disclosed, for example, in Japanese Laid-Open Patent Publication No. 09-039032.

SUMMARY OF THE INVENTION

The injection unit undergoes pivoting by being manually pushed by an operator. However, because the weight of the injection unit is large, it has not been easy for the injection unit to be made to pivot by being manually pushed by the operator.

Thus, the present invention has the object of providing an injection molding machine in which pivoting of the injection unit is facilitated.

One aspect of the present invention is characterized by an injection molding machine including a base, a pivot pin provided on the base, and an injection unit supported by the pivot pin so as to be pivotable relative to the base in a pivoting direction, the injection molding machine including a rod-shaped member configured to cause the injection unit to pivot in the pivoting direction by pushing the injection unit, and a first support member provided on the base and configured to be screw-engaged with the rod-shaped member.

According to the present invention, the injection molding machine is provided in which pivoting of the injection unit is facilitated.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of an injection molding machine according to the present invention will be presented and described in detail below with reference to the accompanying drawings.

Embodiments

Figure 1:
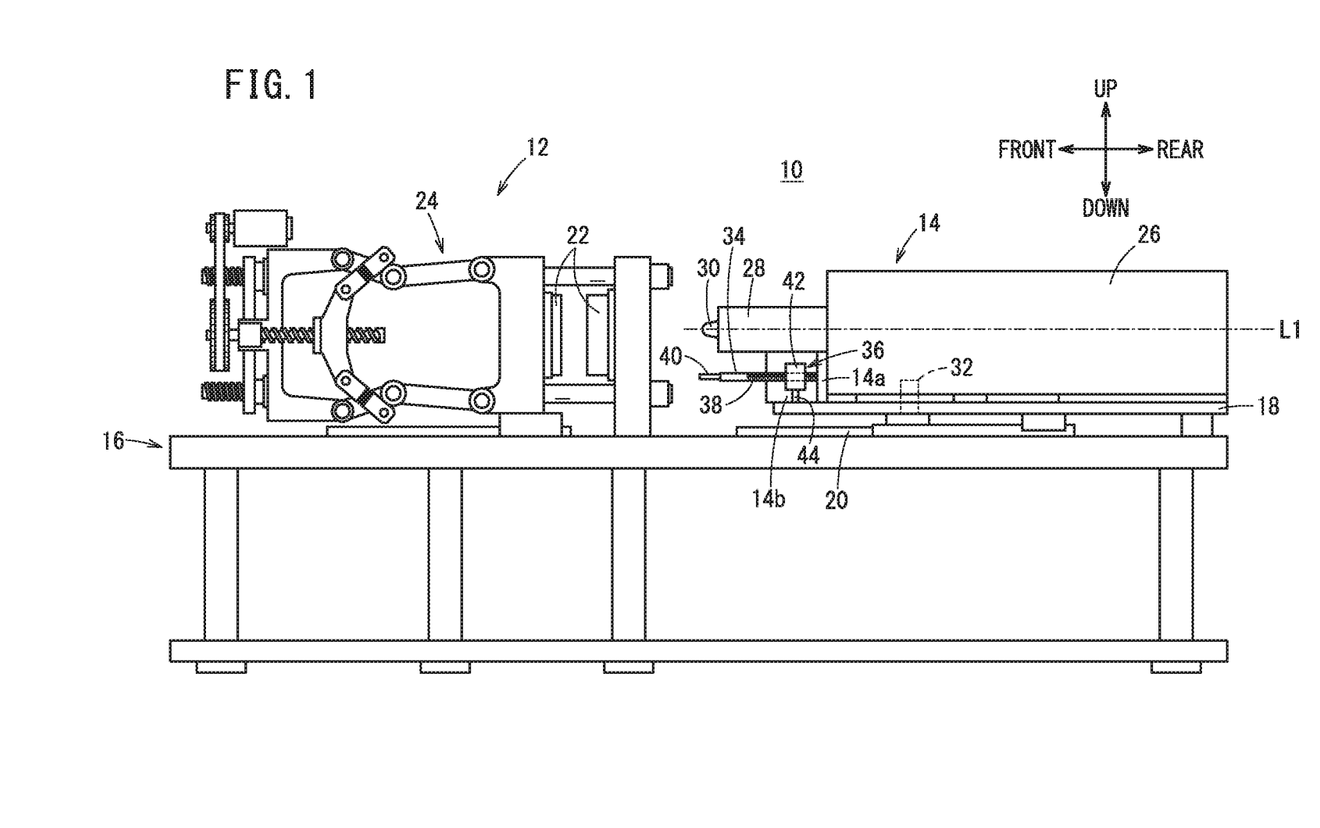
FIG. 1 is a side view of an injection molding machine according to an embodiment of the present invention.

FIG. 1 is a side view of an injection molding machine 10 according to an embodiment of the present invention.

Hereinafter, although a description will be given concerning the injection molding machine 10, descriptions in relation to well-known matters will be omitted as appropriate. The injection molding machine 10 comprises a mold clamping unit 12, an injection unit 14, a machine base 16, a base 18, and a guide rail 20.

In FIG. 1, the direction in which the mold clamping unit 12 and the injection unit 14 face toward each other is defined as a front-rear direction. As viewed from the injection unit 14, the side of the mold clamping unit 12 is defined as a frontward direction. Further, the direction of gravity is defined as a downward direction, and the opposite direction thereto is defined as an upward direction.

The mold clamping unit 12 is supported by the machine base 16. The mold clamping unit 12 includes a mold 22 that is capable of being opened and closed, and an opening and closing mechanism 24 that opens and closes the mold 22. As shown in FIG. 1, the opening and closing mechanism 24 is a toggle type opening and closing mechanism, but is not necessarily limited to being a toggle type opening and closing mechanism.

The guide rail 20 is a member that extends in the front-rear direction, and is supported on the machine base 16. The base 18 is a plate-shaped member that supports the injection unit 14 from below, and the base 18 is supported by the guide rail 20. The mold clamping unit 12 and the injection unit 14 face toward each other in the front-rear direction on the machine base 16.

The base 18 is supported on the guide rail 20, in a manner so as to be capable of undergoing sliding movement along the direction in which the guide rail 20 extends. Consequently, the sliding movement of the base 18 causes the injection unit 14 to move toward and away from the mold clamping unit 12.

The injection unit 14 is equipped with a main body 26 and a heating cylinder 28. Among these members, the heating cylinder 28 is a tubular member attached to the main body 26. The heating cylinder 28 includes a non-illustrated screw on the inner side thereof. Further, a nozzle 30 is attached to a distal end part of the heating cylinder 28. The nozzle 30 includes an opening that allows the interior of the heating cylinder 28 to communicate with the exterior thereof. The reference character L1 in FIG. 1 refers to an axial line of the heating cylinder 28 and the nozzle 30.

The main body 26 is a casing containing therein a non-illustrated drive mechanism that causes the screw inside the heating cylinder 28 to be moved forward and rearward as well as rotated. As shown in FIG. 1, the shape of the main body 26 is substantially in the form of a rectangular parallelepiped, however, the shape thereof is not necessarily limited to being a rectangular parallelepiped.

The injection unit 14 further includes a pivot pin 32. The pivot pin 32 supports the injection unit 14 so as to be capable of rotating in a pivoting direction D1 (and in a direction D2 which is opposite to the pivoting direction) with respect to the base 18. Consequently, the injection unit 14 can be pivoted on the base 18 about the pivot pin 32.

Figure 2:
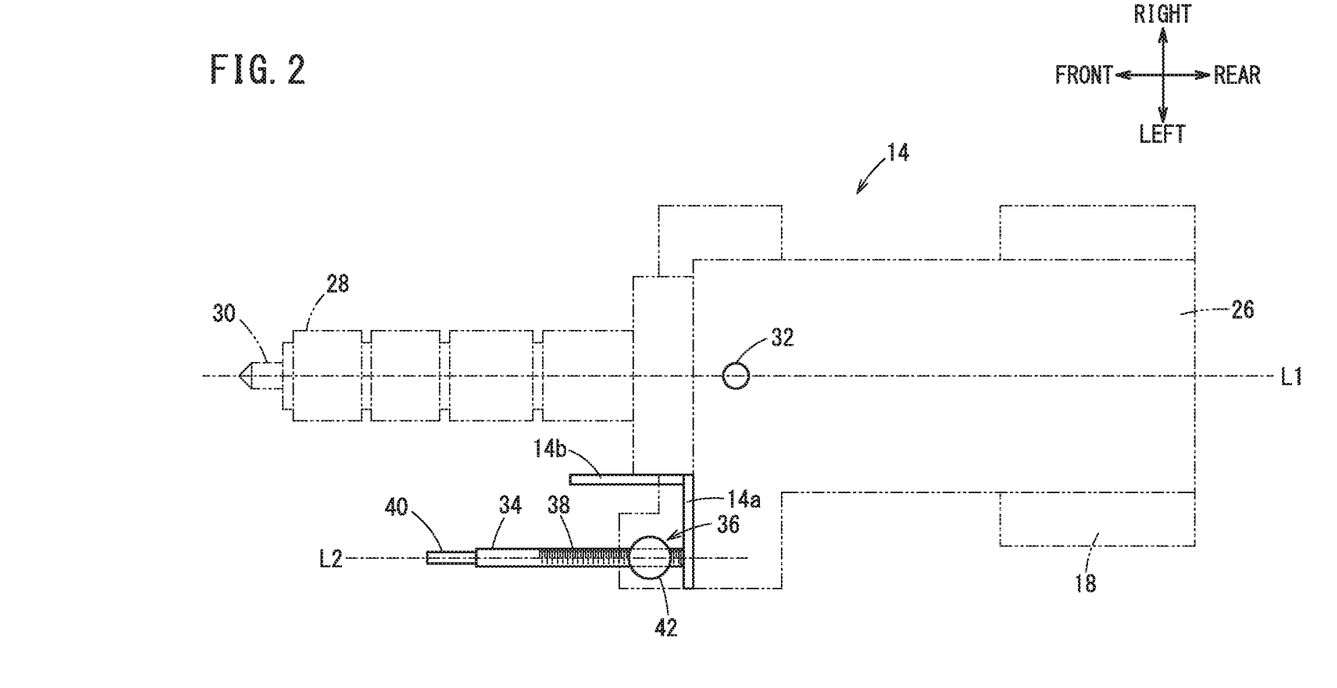
FIG. 2 is a top view of a periphery around an injection unit according to the embodiment.

FIG. 2 is a top view of a periphery around the injection unit 14 according to the embodiment.

In FIG. 2, the front-rear direction is the same as the direction shown in FIG. 1. The right-hand side when facing toward the frontward direction is a rightward direction, whereas the left-hand side is a leftward direction. The same definitions are applied to FIGS. 4 to 6 and FIG. 8, which will be described later.

As shown in FIG. 2, in the present embodiment, the pivot pin 32 is arranged on the axial line L1. Consequently, when the mold 22 and the nozzle 30 are pressed and contacted against each other (placed in a nozzle touching state), the injection unit 14 is prevented from unintentionally pivoting due to a reaction force generated by such a contact pressure.

The injection molding machine 10 having the above-described configuration performs metering of the molten resin in the heating cylinder 28. Further, the metered molten resin is injected from the nozzle 30 into the mold 22. When such a series of operations is repeated, deteriorated resin is gradually accumulated inside the heating cylinder 28. The deteriorated resin is removed when maintenance of the injection unit 14 is performed. The operator, by causing the injection unit 14 to be pivoted as necessary, can easily perform an operation of removing the deteriorated resin.

In this instance, in order to cause the injection unit 14 to undergo pivoting, the heavier the injection unit 14 is, the larger the force required for pushing (pressing) the injection unit becomes. Accordingly, depending on the weight of the injection unit 14, it may be difficult for the operator to manually cause the injection unit 14 to be pivoted.

In view of the above, the injection molding machine 10 according to the present embodiment further includes a first surface 14a, a second surface 14b, a rod-shaped member 34, and a support member (first support member) 36. Next, descriptions of such elements will be presented sequentially.

The first surface 14a and the second surface 14b are surfaces that are pushed (pressed) by the later-described rod-shaped member 34 at the time that the injection unit 14 is pivoted. According to the present embodiment, although not limited to this feature, the first surface 14a and the second surface 14b are provided on the frontward side of the injection unit 14, and on the leftward side of the heating cylinder 28. In this instance, the first surface 14a and the second surface 14b are disposed in a manner so that the normal direction of the first surface 14a and the normal direction of the second surface 14b intersect one another, and more preferably, are perpendicular to each other. According to the present embodiment, as an example, the first surface 14a is disposed so as to face toward the frontward direction, and the second surface 14b is disposed so as to face toward the leftward direction (see FIG. 2).

As the name implies, the rod-shaped member 34 is a member having a rod shape. The reference character L2 in FIG. 2 refers to an axial line of the rod-shaped member 34. The rod-shaped member 34 has a first threaded groove 38 (a male screw) formed along the axial line L2. The first threaded groove 38 is screwed-engaged with a second threaded groove 48 of the first support member 36. The second threaded groove 48 will be described later.

In accordance with such features, the rod-shaped member 34 can be moved relative to the first support member 36 when rotated about the axial line L2. A movable range of such relative movement is the range over which the first threaded groove 38 is formed along the axial line L2.

A gripping member 40 may be provided on the rod-shaped member 34. The material of the gripping member 40 is not particularly limited, but preferably contains a material that prevents the operator's hand that has gripped the gripping member 40 from slipping. The gripping member 40 may be formed by winding a general non-slip tape around the rod-shaped member 34. Consequently, by gripping the gripping member 40, the operator can cause the rod-shaped member 34 to be rotated easily.

The gripping member 40 may be of a shape which has two parallel surfaces so that an operator can turn the gripping member with a general spanner or wrench. Alternatively, the gripping member 40 may have a triangular, quadrangular, or hexagonal cross section whose normal is the axial line L2, whereby a general tool such as a crank handle or a wrench equipped with a hexagonal socket can be attached thereto. Consequently, by using such a tool, the operator can easily cause the rod-shaped member 34 to be rotated.

The first support member 36 is a member that supports the rod-shaped member 34 by being screw-engaged therewith. The rod-shaped member 34 contains, for example, a metal as the material thereof. The first support member 36 is disposed on the base 18. More specifically, assuming that the injection unit 14 is in the state shown in FIG. 2, the first support member 36 is provided on the frontward side of the first surface 14a, and on the leftward side of the second surface 14b.

Figure 3:
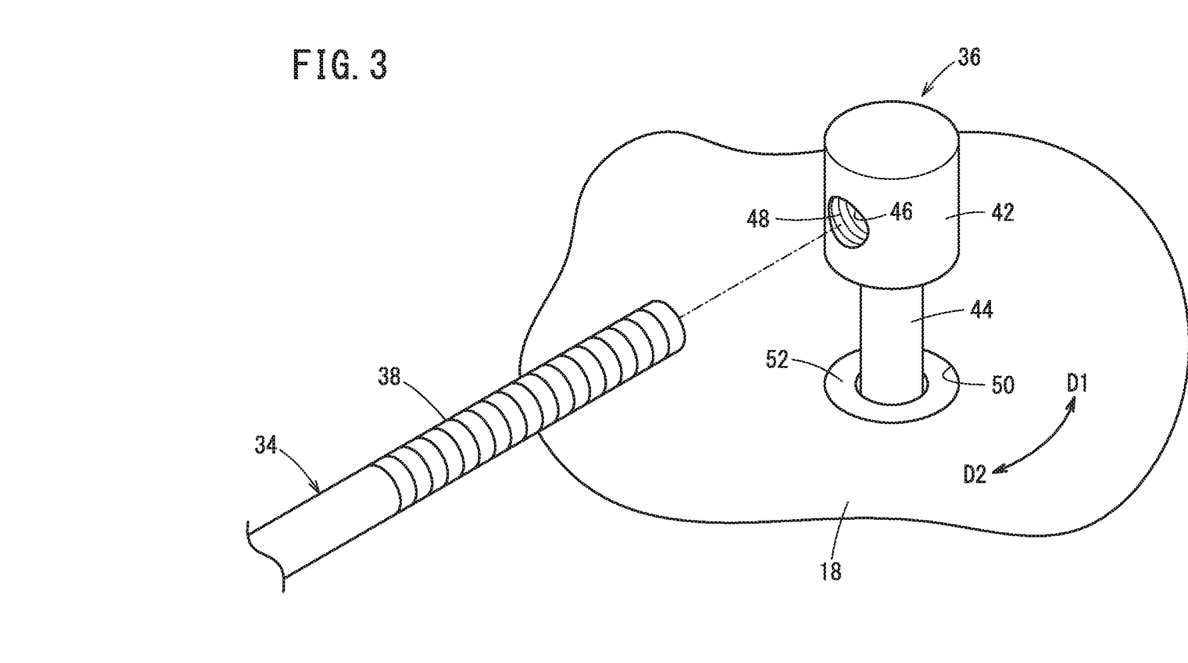
FIG. 3 is a diagram for describing the configuration of a first support member.

FIG. 3 is a diagram for describing the configuration of the first support member 36.

The first support member 36 includes a first rod-supporting member (rod-supporting member) 42, and a first rotating shaft (rotating shaft) 44. The material of the first support member 36 may include, for example, the same metal as the rod-shaped member 34. However, the material is not limited thereto, and the material of the first support member 36 and the material of the rod-shaped member 34 may contain different materials. Further, the first rod-supporting member 42 and the first rotating shaft 44 may contain different materials.

A substantially circular columnar shaped first rod-supporting member 42, and a substantially circular columnar shaped first rotating shaft 44 are shown in FIG. 3. However, the shapes of the first rod-supporting member 42 and the first rotating shaft 44 are not limited to the shapes shown in FIG. 3.

Among the elements that constitute the first support member 36, the first rod-supporting member 42 is formed with a through hole 46 therein through which the rod-shaped member 34 penetrates. A second threaded groove (threaded groove) 48 is formed on an inner surface of the through hole 46. The second threaded groove 48 is a female screw that is screw-engaged with the first threaded groove 38 of the rod-shaped member 34. The first rod-supporting member 42 is supported by the first rotating shaft 44.

The first rotating shaft 44 is inserted into a groove 50 provided in the base 18. Further, the first rotating shaft 44 is rotatably supported by a first bearing member 52 provided inside the groove 50. Consequently, the first rod-supporting member 42 is capable of rotating with respect to the base 18 in the pivoting direction D1, and in the pivoting direction D2 which is opposite to the pivoting direction D1.

In this manner, the first support member 36 need only be capable of achieving a condition in which the rod-shaped member 34 is supported so as to be relatively movable, and in which the supported rod-shaped member 34 can be rotated, and the first support member 36 has a simple structure which is advantageous in terms of miniaturization.

From the standpoint of simplification, the structure of the rod-shaped member 34 is also the same. Since the rod-shaped member 34 and the first support member 36 both have a simple structure, they are advantageous in terms of introduction costs.

Next, a description will be given concerning a procedure to execute pivoting of the injection unit 14 in the injection molding machine 10.

Figure 4:
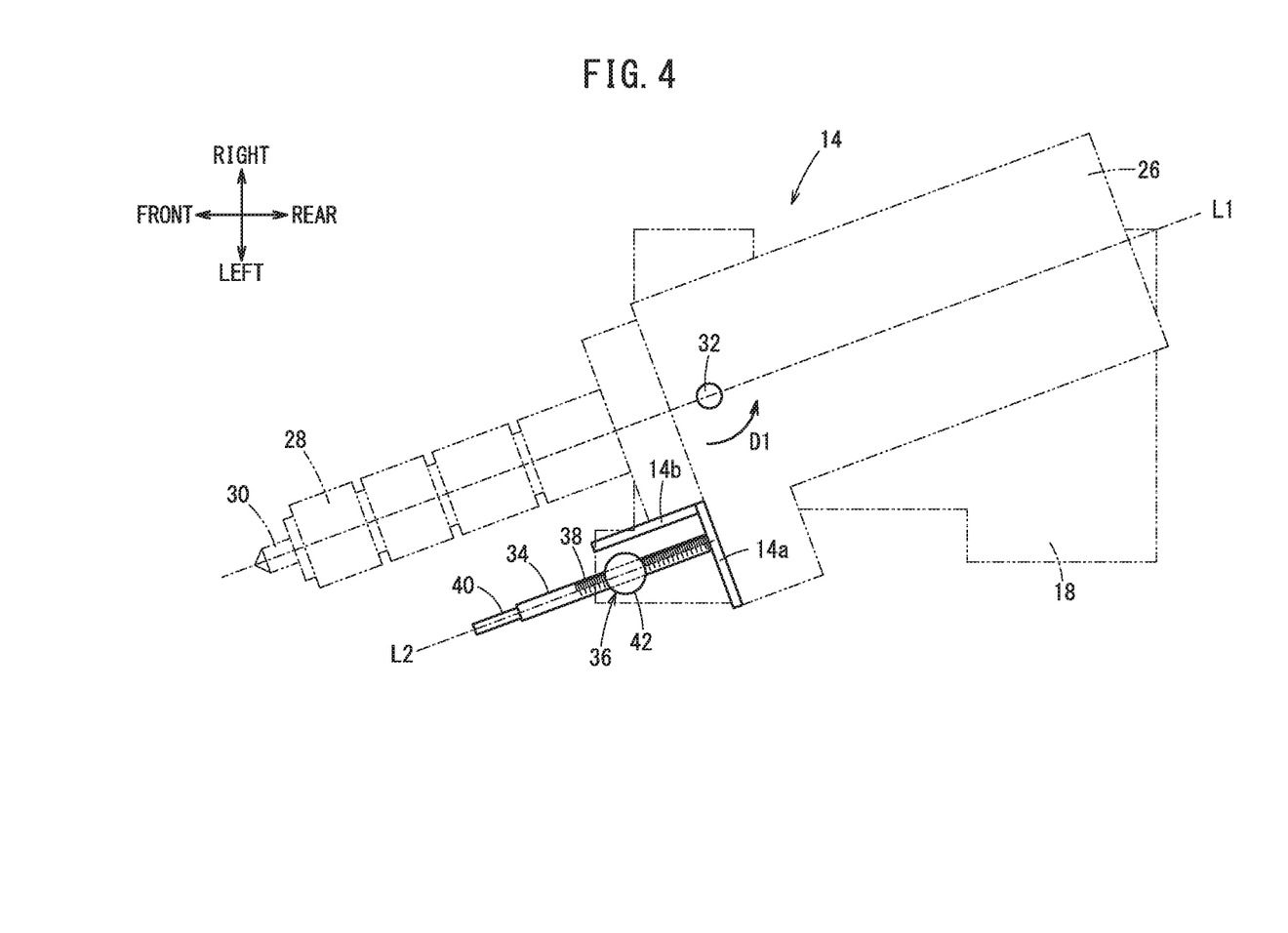
FIG. 4 is a diagram showing an example in which the injection unit is pivoted by a rod-shaped member.

FIG. 4 is a diagram showing an example in which the injection unit 14 is pivoted by the rod-shaped member 34.

In FIG. 4, a case is illustrated in which, from the state shown in FIG. 2, the first surface 14a is pushed by the rod-shaped member 34. In this case, initially, one end of the rod-shaped member 34 in the axial direction is oriented toward the first surface 14a. At this time, preferably, the pivot pin 32 is not positioned on the axial line L2. In such a state, when the rod-shaped member 34 is made to rotate in a predetermined rotation direction, the rod-shaped member 34 moves along the axial line L2, and pushes the first surface 14a in a direction along the axial line L2. Consequently, the injection unit 14 pivots along the pivoting direction D1 about the pivot pin 32.

In the foregoing manner, the operator can easily cause the injection unit 14 to pivot by a simple operation of causing the rod-shaped member 34 to undergo rotation, and without pushing the injection unit 14, which is large in weight, by hand. More specifically, in accordance with the above-described injection molding machine 10, the operator can easily bring about pivoting of the injection unit 14.

Figure 5:
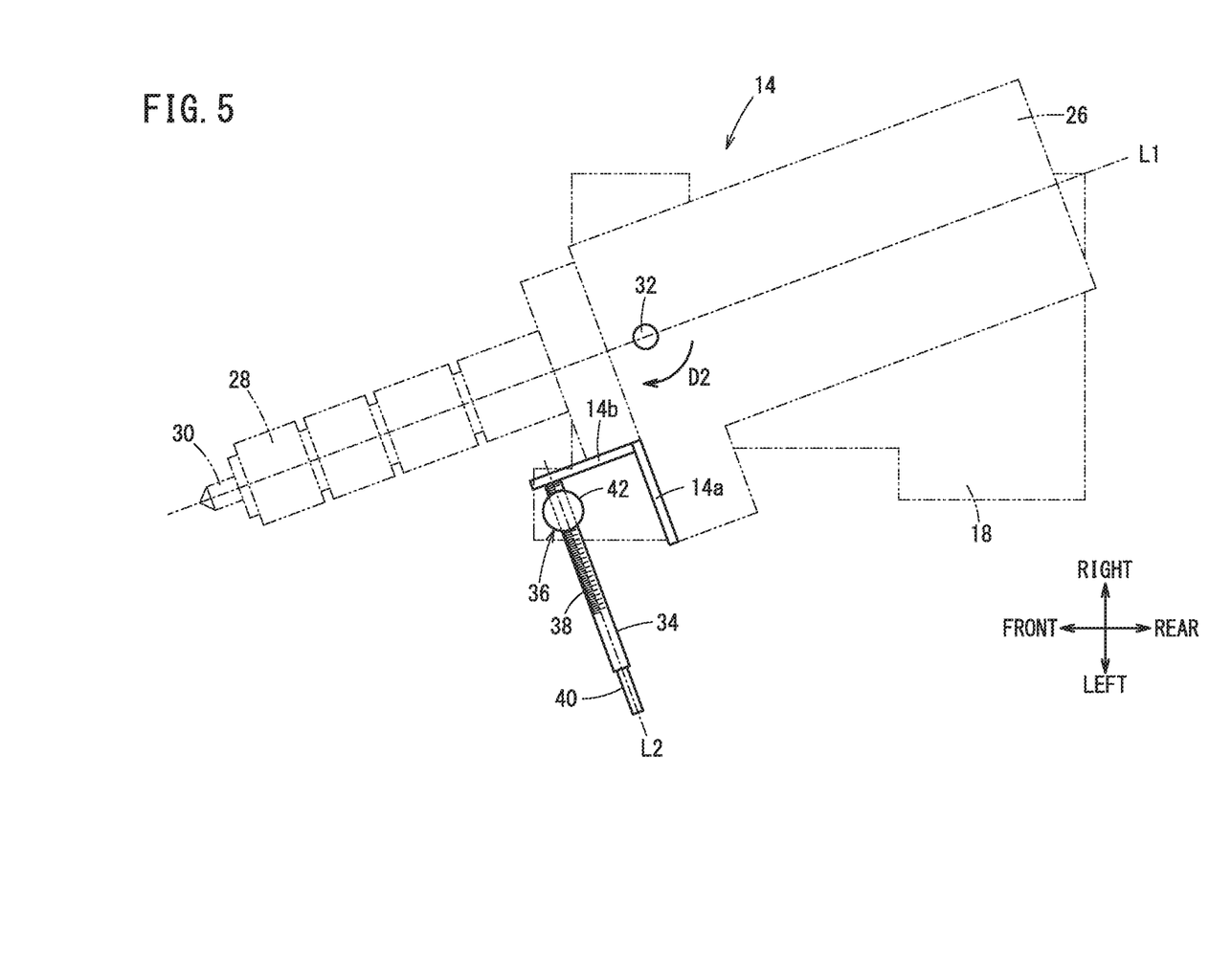
FIG. 5 is a diagram showing another example in which the injection unit is pivoted by the rod-shaped member.

FIG. 5 is a diagram showing another example in which the injection unit 14 is pivoted by the rod-shaped member 34.

In FIG. 5, a case is illustrated in which, from the state shown in FIG. 2, the injection unit 14 is made to pivot in the pivoting direction D1, and thereafter, the second surface 14b is pushed by the rod-shaped member 34. The rod-shaped member 34 pushes the second surface 14b by relatively moving along the axial line L2, in a state with the axial line L2 being oriented toward the second surface 14b. Consequently, the injection unit 14 is pivoted along the pivoting direction D2 which is opposite to the pivoting direction D1.

In the foregoing manner, the operator is capable of causing the injection unit 14 to be pivoted in a direction desired by the operator himself, by selectively and appropriately using the first surface 14a and the second surface 14b having normal directions that differ from each other. For example, after having caused pivoting by pushing the first surface 14a as shown in FIG. 4, the next time, by pushing the second surface 14b, it is also possible to restore the state shown in FIG. 2.

A description of the present embodiment has been given in outline above. However, it should be noted that the configuration according to the present embodiment is not limited to the description given above.

For example, in the injection molding machine 10 according to the present embodiment, there may further be provided a fastening member that fastens the injection unit 14 and the base 18 to each other. The fastening member, for example, is a jack bolt. Further, the injection unit 14 and the base 18 may be appropriately provided with fastening holes in which the fastening member is inserted at the time of fastening.

By fastening the injection unit 14 and the base 18 to each other, pivoting of the injection unit 14 is restricted. Consequently, for example, when placed in the nozzle touching state, the orientation of the nozzle 30 (an orientation along the axial line L1) is suitably prevented from being unintentionally deviated from the direction facing toward the mold 22. Moreover, in the case that the injection unit 14 is to be pivoted, the fastened state by the fastening member may be loosened.

Further, for example, in the injection molding machine 10 according to the present embodiment, there may further be provided an eccentric roller disposed between the injection unit 14 and the base 18. When the injection unit 14 is pivoted, the eccentric roller assists such pivoting by undergoing rotation itself. Consequently, the operator is capable of more easily causing the injection unit 14 to pivot. At this time, by providing the eccentric roller as rearward of the injection unit 14 as possible, the injection unit 14 can be pivoted more easily.

[Modifications]

Although an embodiment has been described above as one example of the present invention, it goes without saying that various modifications or improvements are capable of being added to the above-described embodiment. It is clear from the scope of the claims that other modes to which such modifications or improvements have been added can be included within the technical scope of the present invention.

(Modification 1)

Figure 6:
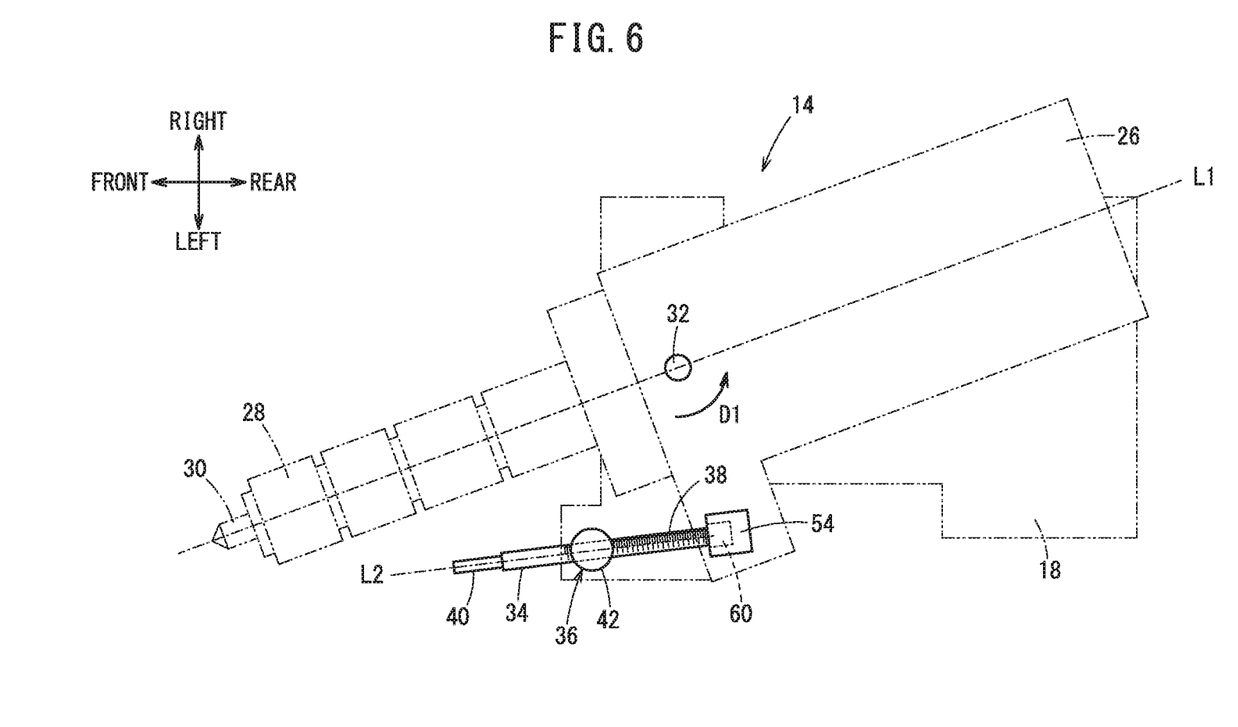
FIG. 6 is a top view of a periphery around an injection unit according to a first modification.
Figure 7:
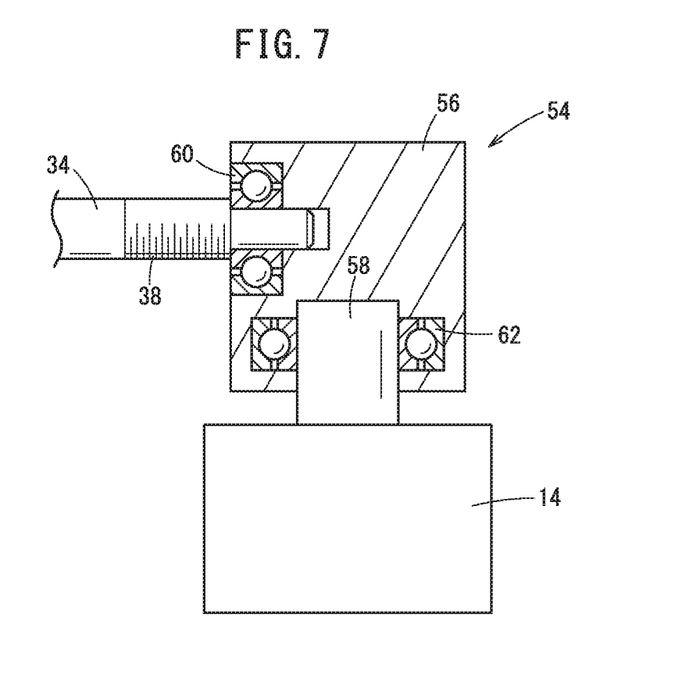
FIG. 7 is a diagram for describing the configuration of a second support member according to the first modification.

FIG. 6 is a top view of a periphery around the injection unit 14 according to a first modification (Modification 1). FIG. 7 is a diagram for describing the configuration of a second support member 54 according to Modification 1.

The injection molding machine 10 may further be equipped with a second support member 54. The second support member 54 is provided on the injection unit 14. The second support member 54 includes a second rod-supporting member 56 and a second rotating shaft 58. Among these elements, the second rod-supporting member 56 includes a second bearing member 60 (bearing member) and a third bearing member 62. Further, the second rotating shaft 58 is fixed to the injection unit 14 and supports the second rod-supporting member 56.

Each of the second bearing member 60 and the third bearing member 62 possessed by the second rod-supporting member 56, for example, is a bearing. The second bearing member 60 serves to support the rod-shaped member 34, and while allowing the rod-shaped member 34 to rotate about the axial line L2, restricts relative movement with respect to itself (the second bearing member 60) along the axial line L2. In relation thereto, according to the present modification, as shown in FIG. 7, there is no need to form the first threaded groove 38 on the portion (distal end part) of the rod-shaped member 34 that is supported by the second bearing member 60. Further, according to the present modification, as shown in FIG. 7, the portion of the rod-shaped member 34 that is supported by the second bearing member 60 is made thinner than the portion of the rod-shaped member 34 on which the first threaded groove 38 is formed. Consequently, insertion of the rod-shaped member 34 into the through hole 46 (see FIG. 3) in which the second threaded groove 48 is formed is not obstructed by the portion of the rod-shaped member 34 that is supported by the second bearing member 60.

The third bearing member 62 serves to rotatably support the second rotating shaft 58. In accordance with this feature, the second rod-supporting member 56 is made rotatable with respect to the injection unit 14. Moreover, in a state that the second rod-supporting member 56 and the second rotating shaft 58 are fixed in place, the second rotating shaft 58 may be disposed so as to be capable of rotating with respect to the injection unit 14.

As described above, the rod-shaped member 34 can be moved relative to the first support member 36. According to the present modification, by effecting such relative movement toward the second rod-supporting member 56, the second rod-supporting member 56 can be pushed by the rod-shaped member 34. When the rod-shaped member 34 pushes the second rod-supporting member 56, the pushing force thereof is also transmitted to the injection unit 14 via the second rod-supporting member 56. Consequently, even with the present modification, the injection unit 14 is easily pivoted along the pivoting direction D1.

Further, according to the present modification, when the rod-shaped member 34 is moved relatively with respect to the first support member 36 in a direction opposite to that at the time of being pushed, the second support member 54 is pulled by the rod-shaped member 34. As a result, a force (pull force) in a direction opposite to that at the time of being pushed is applied to the injection unit 14 via the second support member 54. Consequently, the injection unit 14 is easily pivoted along a pivoting direction D2 which is opposite to the pivoting direction D1.

In the foregoing manner, according to the present modification, it is made easy not only to push and thereby cause the injection unit 14 to be pivoted, but also to pull the injection unit 14 and thereby cause the injection unit 14 to be pivoted in a direction opposite to that at the time of being pushed.

(Modification 2)

Figure 8:
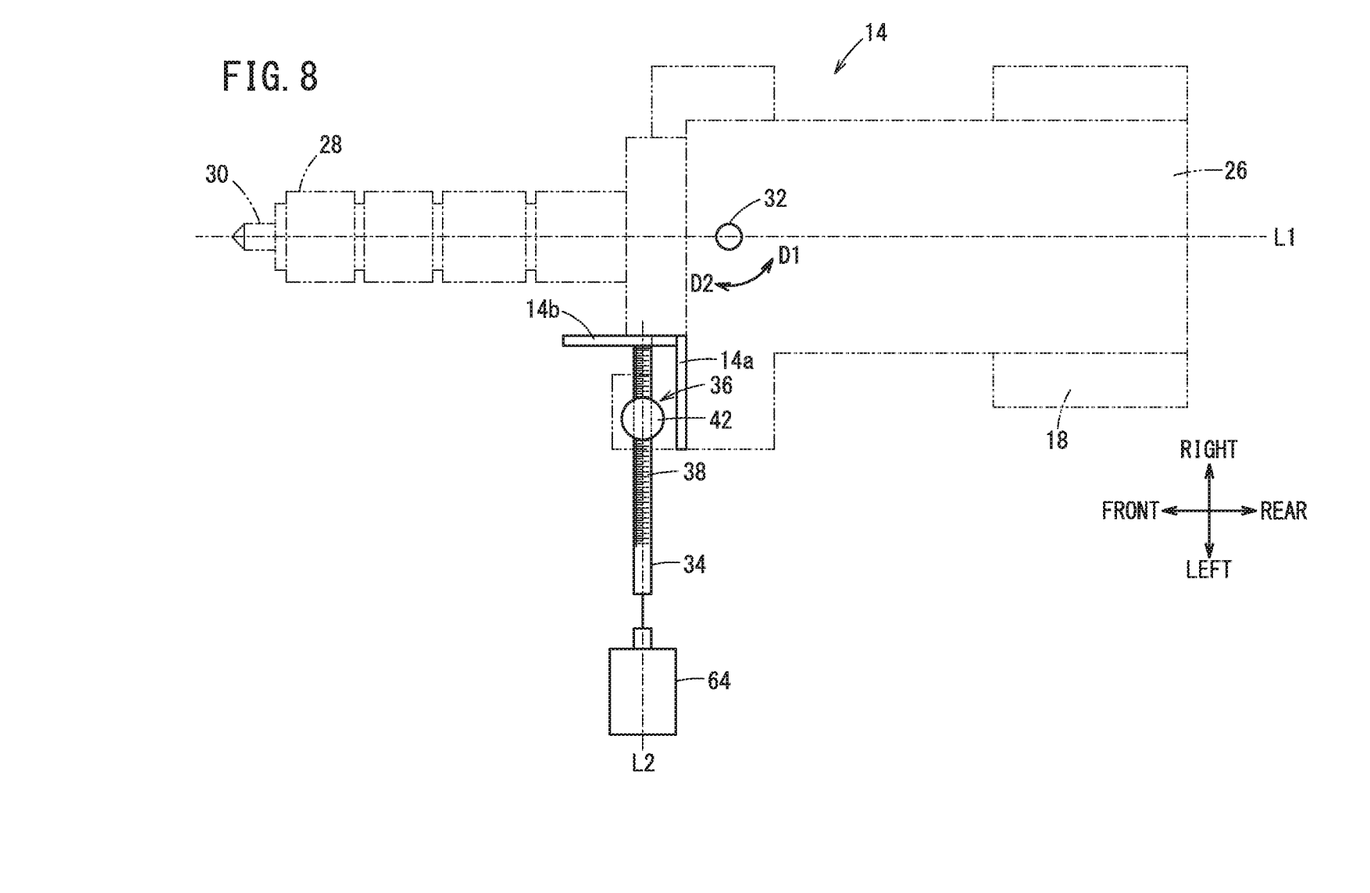
FIG. 8 is a top view of a periphery around an injection unit according to a second modification.

FIG. 8 is a top view of a periphery around the injection unit 14 according to a second modification (Modification 2).

The injection molding machine 10 may further be equipped with a motor 64 which, by being driven, causes the rod-shaped member 34 to push the injection unit 14. The motor 64, for example, is a servo motor. By rotatably connecting the rotary shaft of the motor 64 and the rod-shaped member 34 in an integral manner, the rod-shaped member 34 becomes capable of rotating accompanying rotation of the rotating shaft.

Consequently, in accordance with driving of the motor 64, the injection unit 14 can be pivoted along the pivoting direction D1 or the pivoting direction D2. According to the present modification, the operator can cause the injection unit 14 to pivot more easily than in a case that the operator rotates the rod-shaped member 34 by the operator's own hand.

(Modification 3)

Figure 9:
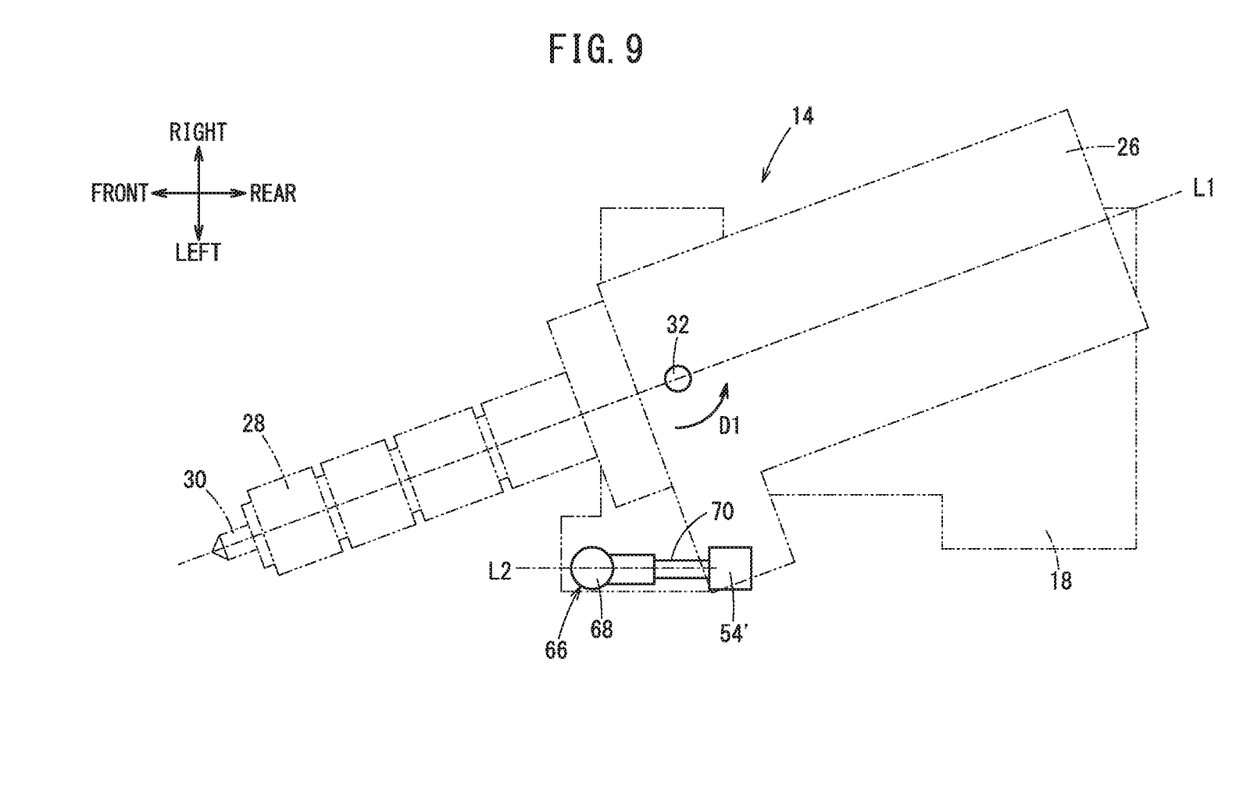
FIG. 9 is a top view of a periphery around an injection unit according to a third modification.

FIG. 9 is a top view of a periphery around the injection unit 14 according to a third modification (Modification 3).

The injection molding machine 10 according to the present modification is equipped with an expansion and contraction mechanism 66 instead of the rod-shaped member 34 and the first support member 36. The expansion and contraction mechanism 66 includes a cylinder 68 and a piston 70. Among these elements, the cylinder 68 is fixed to the base 18. When the expansion and contraction mechanism 66 is driven, the piston 70 moves linearly in a manner so as to expand and contract from the cylinder 68. The driving mode of the expansion and contraction mechanism 66 may be hydraulic, or the driving mode may be electric.

Further, the injection molding machine 10 according to the present modification further includes a third support member 54' provided on the injection unit 14. The third support member 54' has substantially the same configuration as the second support member 54 that was described according to the other modifications, and therefore, description of this feature will be appropriately omitted below.

The third support member 54' is capable of being rotated with respect to the injection unit 14. Further, the third support member 54' is connected to the piston 70. At this time, the second bearing member 60 is not required. The configuration of the third support member 54' and the configuration of the second support member 54 can differ from each other at least in this respect.

With the configuration according to the present modification, the linearly-moving piston 70 of the expansion and contraction mechanism 66 pushes the third support member 54', and pulls on the third support member 54'. The force with which the piston 70 pushes or pulls on the third support member 54' is also transmitted to the injection unit 14. Therefore, according to the present modification, the injection unit 14 can be easily rotated accompanying driving of the expansion and contraction mechanism 66.

Further, since the connected portion between the third support member 54' and the piston 70 is capable of being rotated with respect to the injection unit 14, any concern over the expansion and contraction mechanism 66 and the third support member 54' suffering from damage due to such pushing and pulling from the expansion and contraction mechanism 66 can be reduced.

(Modification 4)

The injection molding machine 10 may be equipped with a plurality of rod-shaped members 34 and a plurality of first support members 36. In accordance with this feature, each of a plurality of operators can simultaneously push the injection unit 14 by different rod-shaped members 34. Consequently, the injection unit 14 can be made to pivot more easily.

Further, the rod-shaped members 34 and the first support members 36 are capable of being easily screw-engaged and disengaged from each other. Accordingly, the operator may perform an operation such as appropriately selecting one from among the plurality of first support members 36 for causing the one first support member to support the rod-shaped member 34.

(Modification 5)

The first rotating shaft 44 may be omitted from the configuration of the first support member 36. In this case, the first support member 36 may be disposed at a position where not both, but either one of the first surface 14a and the second surface 14b is capable of being pushed by the rod-shaped member 34.

Consequently, although switching of the pushing direction is restricted, an unintended change in the pushing direction during pushing can be more reliably prevented. Further, by eliminating the first rotating shaft 44, the configuration of the injection molding machine 10 can be made simpler.

Further, according to the present modification, the one of the first surface 14a and the second surface 14b that cannot be pushed by the rod-shaped member 34 can be omitted from the configuration of the injection molding machine 10. In accordance with this feature, the configuration of the injection molding machine 10 can be further simplified.

(Modification 6)

The above-described embodiment and the modifications thereof may be appropriately combined within a range in which no technical inconsistencies occur.

Inventions that can be Obtained from the Embodiment

The inventions that can be grasped from the above-described embodiment and the modifications thereof will be described below.

The present invention is characterized by the injection molding machine (10) including the base (18), the pivot pin (32) provided on the base (18), and the injection unit (14) which is supported by the pivot pin (32) so as to be capable of pivoting relative to the base (18) in the pivoting direction (D1, D2), the injection molding machine (10) including the rod-shaped member (34) that causes the injection unit (14) to pivot in the pivoting direction (D1, D2) by pushing the injection unit (14), and the first support member (36) which is provided on the base (18) and is configured to be screw-engaged with the rod-shaped member (34).

In accordance with such features, the injection molding machine (10) is provided in which pivoting of the injection unit (14) is facilitated.

The first support member (36) may include the rotating shaft (44) provided so as to be capable of rotating relative to the base (18) in the pivoting direction (D1, D2), and the rod-supporting member (42) supported by the rotating shaft (44) and having, formed therein, the through hole (46) through which the rod-shaped member (34) penetrates, and in the rod-supporting member (42), the threaded groove (48) which is screw-engaged with the rod-shaped member (34) may be formed on the inner side surface of the through hole (46). In accordance with such features, the rotating shaft (44) can be made to rotate the rod-shaped member (34), which is screwed-engaged with the first support member (36), in the pivoting direction (D1, D2).

The injection unit (14) may be provided with the first surface (14a), and the second surface (14b) that differs from the first surface (14a), and the injection unit (14) pivots in the pivoting direction (D1) by the first surface (14a) being pushed, and pivots in an opposite direction (D2) to the pivoting direction (D1) by the second surface (14b) being pushed. In accordance with this feature, the injection unit (14) can be easily pivoted in different directions (D1, D2) by selectively and properly using pushing of the first surface (14a) and pushing of the second surface (14b).

The injection molding machine (10) may further include the second support member (54) provided on the injection unit (14) so as to be capable of rotating relative to the injection unit (14) in the pivoting direction (D1, D2), and the second support member (54) may include the bearing member (60) which is fitted with the rod-shaped member (34), and restricts movement of the rod-shaped member (34) in the axial direction. In accordance with such features, it becomes possible to cause the injection unit (14) to pivot in a direction opposite to that at the time of being pushed.

The rod-shaped member (34) may be provided with a gripping member (40) configured to be gripped by an operator. In accordance with this feature, the operator can easily cause the rod-shaped member (34) to be rotated by gripping the gripping member (40). Further, by configuring the shape of the gripping member (40) in a manner so that a general tool can be attached thereto, the rod-shaped member (34) can be easily made to rotate.

The injection molding machine (10) may further include the motor (64) having the rotary shaft connected to the rod-shaped member (34), wherein the rod-shaped member (34) pushes the injection unit (14) due to the rotary shaft being rotated. In accordance with this feature, the injection unit (14) can be easily pivoted in response to the driving of the motor (64).

What is claimed is:

1. An injection molding machine comprising:
    a base,
    a pivot pin provided on the base, and
    an injection unit supported by the pivot pin so as to be pivotable relative to the base in a pivoting direction, wherein the injection unit includes a heating cylinder and the pivot pin is arranged on an axial line of the heating cylinder,
    a rod-shaped member configured to cause the injection unit to pivot in the pivoting direction by pushing the injection unit; and
    a first support member provided on the base and configured to be screw-engaged with the rod-shaped member,
    wherein the rod-shaped member includes a distal end part that pushes the injection unit when the pivot pin is in a state of being off an axial line of the rod-shaped member in plan view;
    the first support member comprises a rotating shaft provided so as to be rotatable relative to the base in the pivoting direction, and a rod-supporting member supported by the rotating shaft and having, formed therein, a through hole through which the rod-shaped member penetrates; and
    in the rod-supporting member, a threaded groove configured to be screw-engaged with the rod-shaped member is formed on an inner surface of the through hole.

2. The injection molding machine according to claim 1, wherein:
    the injection unit is provided with a first surface, and a second surface that differs from the first surface; and
    the injection unit pivots in the pivoting direction by the first surface being pushed, and pivots in an opposite direction to the pivoting direction by the second surface being pushed.

3. The injection molding machine according to claim 1, further comprising:
    a second support member provided on the injection unit so as to be rotatable relative to the injection unit in the pivoting direction; and
    the second support member comprises a bearing member configured to be fitted with the rod-shaped member, and to restrict movement of the rod-shaped member in an axial direction.

4. The injection molding machine according to claim 1, wherein the rod-shaped member is provided with a gripping member configured to be gripped by an operator.

5. The injection molding machine according to claim 1, further comprising:
    a motor having a rotary shaft connected to the rod-shaped member;
    wherein the rod-shaped member pushes the injection unit due to the rotary shaft being rotated.

6. The injection molding machine according to claim 1, wherein the rod-shaped member is rotatable relative to the first support member and pivotable with the first support member to pivot the injection unit about the pivot pin and relative to the base.

7. The injection molding machine according to claim 1, wherein the rod-shaped member is aligned with a main body of the injection unit to impart linear force through the main body and cause the main body to pivot the injection unit about the pivot pin as the rod-shaped member rotates and translates relative to the first support member.

8. The injection molding machine according to claim 1, further comprising at least one second rod-member that cooperates with the rod-shaped member to cause the injection unit to pivot by pushing the injection unit.

9. The injection molding machine according to claim 1, further comprising at least one second support member.

10. An injection molding machine comprising:
a base slidably provided above a machine base,
a pivot pin provided on the machine base, and
an injection unit supported by the pivot pin so as to be pivotable relative to the base in a pivoting direction, wherein the injection unit includes a heating cylinder and the pivot pin is arranged on an axial line of the heating cylinder,
a rod-shaped member configured to cause the injection unit to pivot in the pivoting direction by pushing the injection unit; and
a first support member provided on the base and configured to be screw-engaged with the rod-shaped member,
wherein when the pivot pin is in a state of being off an axial line of the rod-shaped member in plan view, the rod-shaped member is displaced with respect to the machine base, thereby pushing the injection unit, and
the first support member comprises a rotating shaft provided so as to be rotatable relative to the base in the pivoting direction, and a rod-supporting member supported by the rotating shaft and having, formed therein, a through hole through which the rod-shaped member penetrates; and
in the rod-supporting member, a threaded groove configured to be screw-engaged with the rod-shaped member is formed on an inner surface of the through hole.

11. An injection molding machine comprising:
a base,
a pivot pin provided on the base, and
an injection unit supported by the pivot pin so as to be pivotable relative to the base in a pivoting direction, wherein the injection unit includes a heating cylinder and the pivot pin is arranged on an axial line of the heating cylinder,
a rod-shaped member configured to cause the injection unit to pivot from an unpivoted position to a pivoted position by pushing the injection unit in a rearward direction; and
a first support member provided on the base and configured to be screw-engaged with the rod-shaped member,
wherein the rod-shaped member pushes the injection unit when the pivot pin is in a state of being off an axial line of the rod-shaped member in plan view,
the first support member comprises a rotating shaft provided so as to be rotatable relative to the base in the pivoting direction, and a rod-supporting member supported by the rotating shaft and having, formed therein, a through hole through which the rod-shaped member penetrates; and
in the rod-supporting member, a threaded groove configured to be screw-engaged with the rod-shaped member is formed on an inner surface of the through hole.

12. The injection molding machine of claim 11, wherein the rod-shaped member defines a longitudinal axis, the rod-shaped member being configured to pivot about a second axis that extends through the rod-shaped member and is transverse to the longitudinal axis as the rod-shaped member translates relative to the longitudinal axis of the rod-shaped member.

13. The injection molding machine of claim 11, wherein the rod-shaped member is laterally offset from a centerline or central longitudinal axis of the injection molding machine that extends through the pivot pin when the injection unit is disposed in the unpivoted position.

* * * * *